US009098974B2

(12) United States Patent
Mayeroff et al.

(10) Patent No.: US 9,098,974 B2
(45) **Date of Patent: *Aug. 4, 2015**

(54) METHOD, SYSTEM, AND DEVICE FOR SELECTING AND AWARDING BONUS AWARDS FROM AN AWARD SERVER

(71) Applicant: Konami Gaming, Inc., Las Vegas, NV (US)

(72) Inventors: Jason Mayeroff, Reno, NV (US); Robert Ryan Morishita, Las Vegas, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,210

(22) Filed: Jul. 14, 2014

(65) Prior Publication Data

US 2015/0011302 A1 Jan. 8, 2015

Related U.S. Application Data

(63) Continuation-in-part of application No. 11/900,277, filed on Sep. 10, 2007, now Pat. No. 8,777,749, and a continuation-in-part of application No. 14/162,629, filed on Jan. 23, 2014, now Pat. No. 8,851,973, said application No. 11/900,277 is a continuation-in-part of application No. 11/827,574, filed on Jul. 11, 2007, now Pat. No. 8,668,573, said application No. 14/162,629 is a continuation-in-part of application No. 11/827,574, filed on Jul. 11, 2007, now Pat. No. 8,668,573, which is a continuation-in-part of application No. 10/815,304, filed on Mar. 31, 2004, now Pat. No. 8,777,719, said application No. 11/900,277 is a continuation-in-part of application No. 11/804,432, filed on May 18, 2007.

(60) Provisional application No. 60/464,937, filed on Apr. 22, 2003.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/3244* (2013.01); *G07F 17/326* (2013.01); *G07F 17/3225* (2013.01); *G07F 17/3262* (2013.01)

(58) Field of Classification Search
USPC .............................. 463/16, 20, 25, 32, 40, 42
See application file for complete search history.

(56) References Cited

U.S. PATENT DOCUMENTS 6,059,658 A * 5/2000 Mangano et al. ............... 463/16
6,089,978 A * 7/2000 Adams ............................ 463/20

(Continued)

*Primary Examiner* — Adetokunbo O Torimiro
(74) *Attorney, Agent, or Firm* — Howard & Howard Attorneys PLLC

(57) ABSTRACT

A system includes a user device in communication with an award server. The user device executes a game application to earn a bonus award. However, the bonus award is not issued by the user device. Rather, the bonus award is stored at the award server. In one optional embodiment, the bonus award may be issued through a gaming device which receives the bonus award from the award server and executes a gambling game which may result in the issuance of the bonus award. Additionally or alternatively, the bonus award may be issued through a redemption device.

20 Claims, 11 Drawing Sheets

(56) References Cited

U.S. PATENT DOCUMENTS 6,149,273 A * 11/2000 Matthews .................... 351/221
6,203,429 B1 * 3/2001 Demar et al. .................. 463/20
2002/0065126 A1 * 5/2002 Miller et al. .................... 463/20

* cited by examiner

METHOD, SYSTEM, AND DEVICE FOR SELECTING AND AWARDING BONUS AWARDS FROM AN AWARD SERVER

RELATED APPLICATION DATA

The present application is a continuation-in-part of U.S. patent application Ser. No. 11/900,277, entitled "Gaming System and Method of Operation," filed on Sep. 10, 2007, and a continuation-in-part of U.S. patent application Ser. No. 14/162,629, entitled "Method, System, and Device for Conducting a Gambling Game to Issue an Escrow Award," filed on Jan. 23, 2014, both of which were continuations-in-part of U.S. patent application Ser. No. 11/827,574, entitled "Gaming Device and Method of Issuing a Bonus Award," filed Jul. 11, 2007 by Applicant herein which, in turn, was a continuation-in-part of U.S. patent application Ser. No. 10/815,304, entitled "Gaming Device and Method of Display a Changeable Bonus Value Feature," filed Mar. 31, 2004 by Applicant herein which, in turn, claimed the benefit of U.S. Provisional Patent Application Ser. No. 60/464,937, entitled "Gaming Device and Method of Displaying a Three-Dimensional Bonus Feature," filed Apr. 22, 2003 by Applicant herein. The present application is also a continuation-in-part of U.S. patent application Ser. No. 11/804,432, entitled "Gaming System and Method of Operation," filed May 18, 2007 by Applicant herein.

FIELD OF THE INVENTION

The present invention relates to gaming systems. More particularly, the present invention relates to a system and method of operating a system, in which a bonus award earned from a mobile device is transmitted to a gaming device.

BACKGROUND OF THE INVENTION

Gaming machines take many forms, such as video gaming machines which conduct video reel slot machine games or video card games, mechanical slot machines, electronic table games, or the like. However, all these gaming machines issue awards similarly. That is, the awards are issued to the player in currency or a form representing currency.

For example, in a typical gaming machine, currency is deposited into the gaming machine via a bill acceptor, or a voucher representing currency is deposited into the gaming machine via a ticket receiver. The amount deposited is tracked as gaming credits in a credit register in the gaming machine. The game is conducted, with wagers deducted from the credit register and winnings added to the credit register. Upon completing a play session, the player depresses a "cash out" button and the balance in the credit register is provided to the player in the form of cash, coin, or, more commonly, a voucher.

A drawback of cash, coin, or vouchers is the possibility of physical loss of the cash, coin, or voucher. For example, vouchers are not tracked in any way that allows a casino to replace a lost, damaged, or destroyed voucher. As may be appreciated, the physical loss of a voucher representing a large sum of money may be very disconcerting for a player.

For the part of the casino, cash, coin, and vouchers can represent a lost opportunity to get the player to spend the money represented. That is, once the player has "cashed out," the money is very real to the player and he or she may be less likely to participate in further gaming activities.

Additionally, monetary awards have a fixed value to the casino. It is known, for example, that offering prizes in-kind allows the casino to offer a prize that has a greater value to the player than the cost to the casino. For example, Walker, U.S. Patent Application Publication No. US 2003/0013516, discloses a method and apparatus for offering and providing consolation, in-kind prizes based on the player's losses and the player's history of play gleaned from player tracking data.

It can be seen that there is a need in the art for a system and method in which bonus award data are transmitted for display at a bonus selection apparatus from a remote award server.

SUMMARY OF THE INVENTION

A gaming system includes an award server in communication with a user device and a gaming device. In an optional embodiment, a user device includes a user device processor in communication with a user device display and a user device memory. The user device memory stores program instructions executable by the user device processor. In an optional embodiment, an outcome of a game application is displayed at the user device display. The outcome of the game application may include a bonus award which is earned through the game application without issuing the bonus award at the user device.

In one optional embodiment, a bonus award may be selected at a user device. For example, in one optional embodiment, at least one selection of a bonus award is received when the outcome of the game application includes a bonus award. In one such example, a plurality of possible bonus awards is received at the user device and displayed at the user device display. Player input is received at the user device processor selecting at least one of the possible bonus awards which was earned through the game application but not issued at the user device. The bonus award selection is transmitted to the award server.

A system also includes an award server in communication with the user device. In an optional embodiment, the award server includes an award server processor and an award server memory in communication with the award server processor. The award server memory stores program instructions to receive the bonus award from the user device and store the bonus award in association with a player identifier.

The award server communicates with at least one gaming device. The gaming device, in turn, may communicate with a display which could be part of the user device, part of the gaming device, or separate from the user device and gaming device. The gaming device is separate from the award server and operates independently from the award server.

The gaming device includes a gaming device processor. The gaming device processor includes a random number generator which is configured to generate a random number used, at least in part, to generate an outcome for a gambling game. The gaming device also includes a gaming device interface and a gaming device memory, both of which are in communication with the gaming device processor.

In an optional embodiment, the gaming device memory stores at least one bonus award trigger and program instructions executable by the gaming device processor. In an optional embodiment, the program instructions receiving the bonus award from the award server. In one optional embodiment, a player identifier is received through the gaming device interface and the bonus awards associated with the player identifier are received from the award server. In an optional embodiment, a bonus indicium associated with the bonus award is displayed on the display.

The gambling game is conducted. In one such optional embodiment, the gambling game is conducted by receiving a wager through the gaming device interface, which prompts the gaming device processor to randomly select an outcome for the gambling game using the random number generator. The wager is resolved by the gaming device processor based on the outcome of the gambling game.

The gaming device processor determines whether a bonus award trigger has occurred. In one optional embodiment, the bonus award trigger is determined, at least in part, by the outcome of the gambling game generated by the gaming device processor. In another optional embodiment, the bonus award trigger is independent of the outcome of the gambling game generated by the gaming device processor.

The bonus award is issued at the gaming device when the bonus award trigger occurs. As noted above, in one optional embodiment, the player may select the bonus award using the user device prior to playing the gambling game. In another optional embodiment, the award server selects a bonus award based on input at the gaming device interface. In one optional embodiment, the bonus award may be selected by the player, who inputs the selection through the gaming device interface. In another optional embodiment, the award server dynamically selects the bonus award based on player input. For example, in one optional embodiment, player input (such as player data, wager data, game data, or the like) is received through the gaming device interface. The player input is communicated from the gaming device processor to the award server. The award server dynamically selects at least one bonus award for the player based, at least in part, on the player input. In another optional embodiment, the award server selects the bonus award indicium for display at the display. In such an optional embodiment, the bonus award indicium selected for display at the display is dynamically selected by the award server at least partially in response to the player input. In either case, the bonus award (or bonus award indicium) selected by the award server may also be based, at least in part, on the bonus award earned at the user device. In an optional embodiment, the bonus award (or bonus award indicium) selected by the award server may be changeable by the award server in response to changes in the player input.

In an optional embodiment, a bonus award may be available at the gaming device until the bonus award is issued as the result of a bonus award trigger. In another optional embodiment, the bonus award may be available at the gaming device until a refresh event, or a bonus award trigger, whichever occurs first. In one such optional embodiment, the gaming device memory stores at least one display refresh event. The display refresh event could include any event, including the removal of the player identifier received at the gaming device. Thus, in one such embodiment, the bonus award is available to be issued only in gambling games conducted while in receipt of the player identifier associated with the bonus award. Other display refresh events could include a fixed or random quantity of games, time elapsed, or the like. The bonus award may be held at the display until the occurrence of a bonus award trigger or a display refresh event, whichever occurs first.

Alternatively or additionally, the bonus award may be issued at a redemption device. In one such optional embodiment, a system includes a redemption device in communication with the award server. The redemption device includes a redemption device processor in communication with a redemption device memory. The redemption device memory stores program instructions executable by the redemption device processor. In one such optional embodiment, the redemption device receives a bonus award from the award server. The redemption device receives a prompt to issue the bonus award at the redemption device. In an optional embodiment, the prompt is received through a redemption device interface, a user device in communication with the redemption device, or the like. The bonus award is issued at the redemption device in response to the prompt.

In an optional embodiment, bonus awards may be transferable. For example, in one optional embodiment, the award server may include program instructions to receive a transfer request including a first player identifier associated with a bonus award and a second player identifier. In response to the transfer request, the bonus award may be transferred to the account identified by the second player identifier. Optionally, the award server may disassociate the bonus award with the first player identifier in response to the transfer request, i.e., the transfer may merely transfer, and not duplicate, the bonus award.

DESCRIPTION

Figure 1:
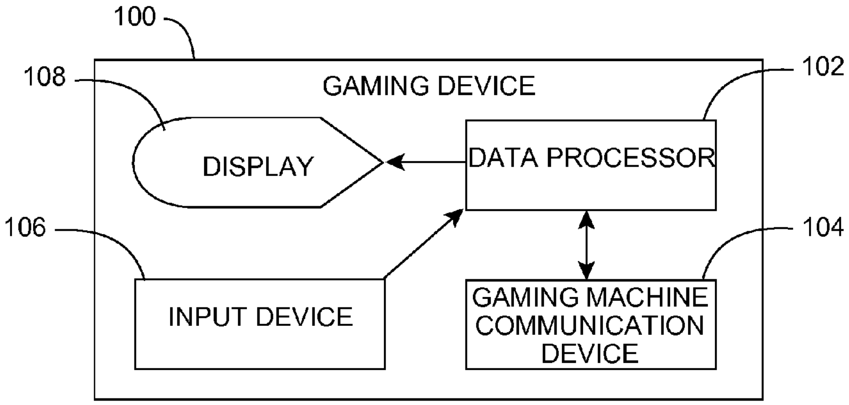
FIG. 1 is a block diagram of a gaming machine according to an embodiment of the present invention.
Figure 2:
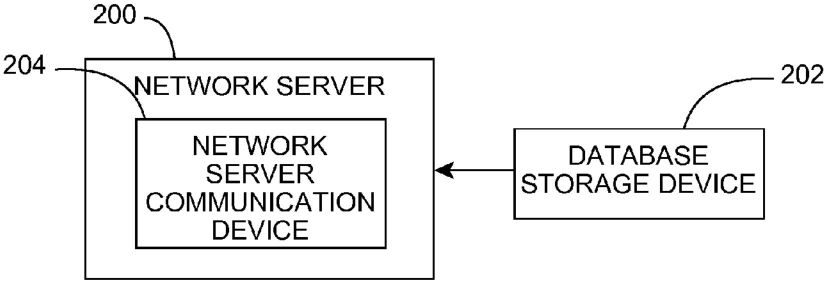
FIG. 2 is a block diagram of a network server according to an embodiment of the present invention.

Reference is now made to the figures wherein like parts are referred to by like numerals throughout. Referring generally to FIGS. 1-16, the present invention is directed to a system and method for conducting gaming. The invention includes one or more gaming devices 100. The gaming device 100 may take any form. The gaming device 100 includes a game processor 102 and a gaming device communication device 104 communicating with, and under the control of, the game processor 102. The game processor 102 operates a random number generator; the random number generator may be hardware, software, an embedded device, a combination thereof, or the like. The gaming device communication device

104 could take any form, such as a modem, router, hub, network interface card ("NIC") or other device adapted to transmit and receive data. In an optional embodiment, the gaming device additionally includes an input device 106 communicating with the game processor. The gaming device may include a display 108, or may communicate with a display.

The gaming device 100 communicates with an award server 300. In an optional embodiment, the gaming device 100 may communicate directly to an award server 300 such as through a direct connection. In another optional embodiment, the gaming device 100 communicates to an award server 300 through a network, such as an intranet, a local area network, a wide area network, a world wide web on the Internet, or other computer network.

Figure 3:
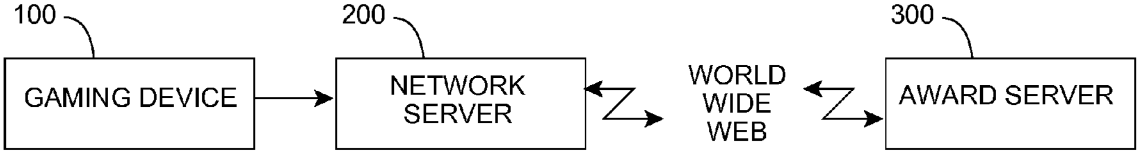
FIG. 3 is a block diagram of a system according to an embodiment of the present invention.
Figure 4:
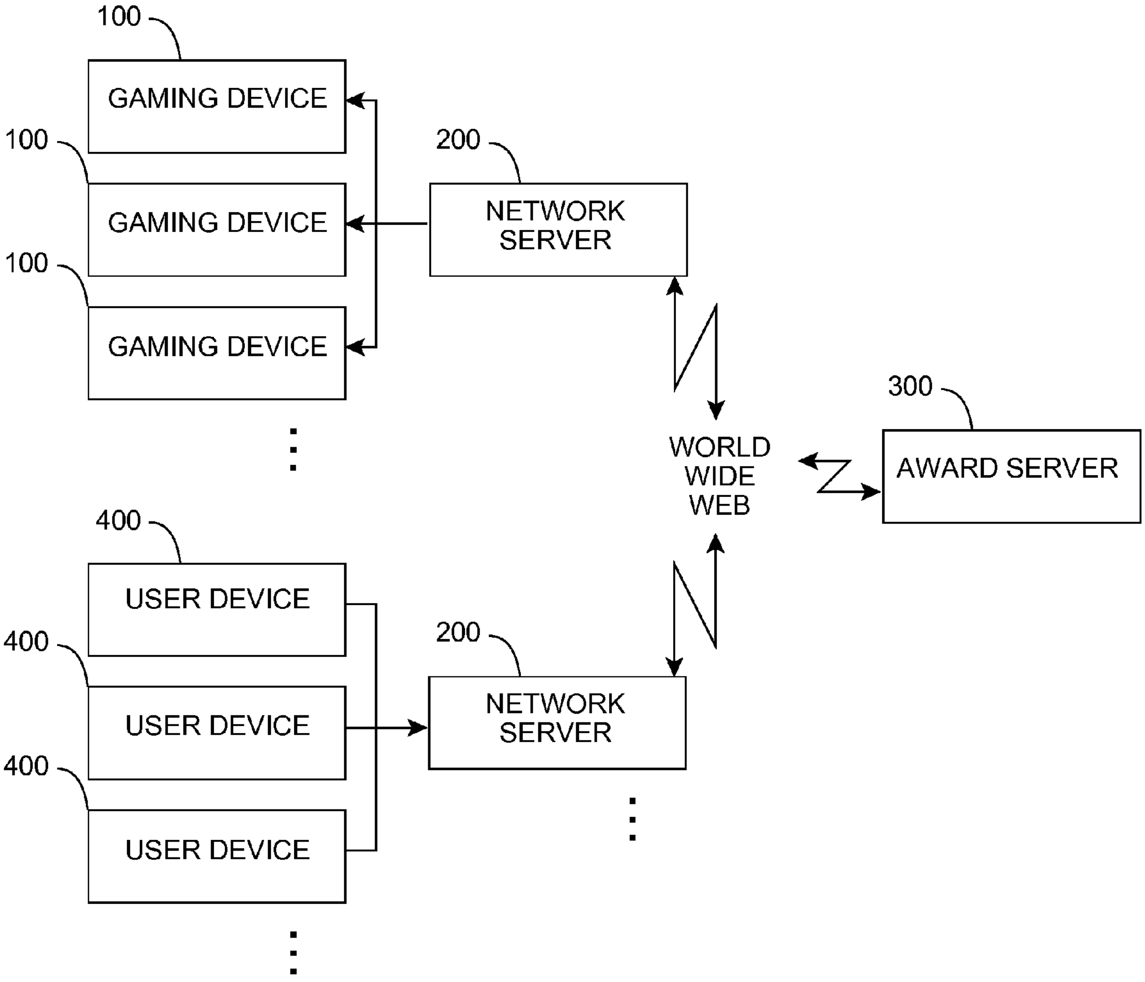
FIG. 4 is a block diagram of a system according to an embodiment of the present invention.
Figure 5:
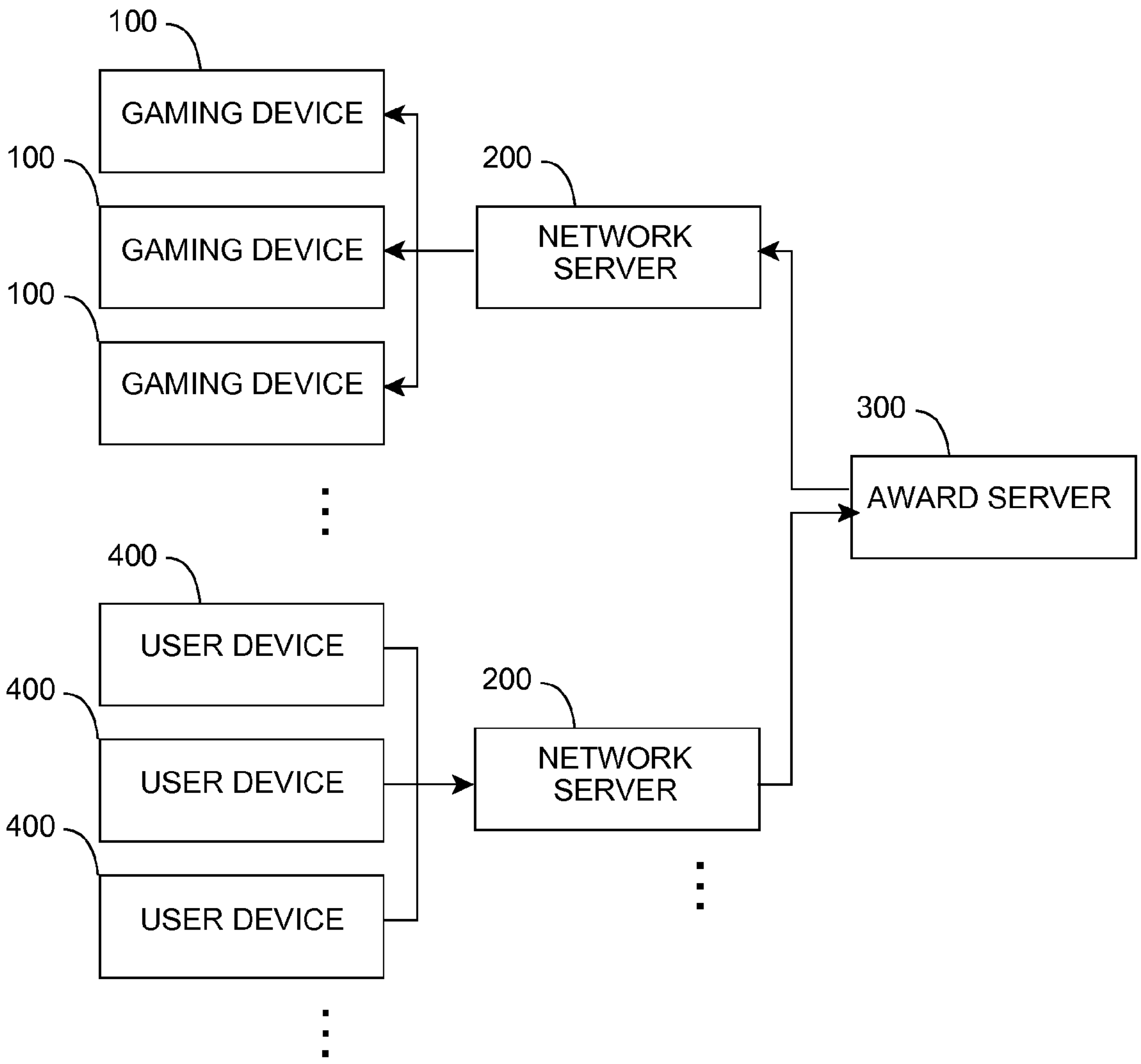
FIG. 5 is a block diagram of a system according to an embodiment of the present invention.
Figure 6:
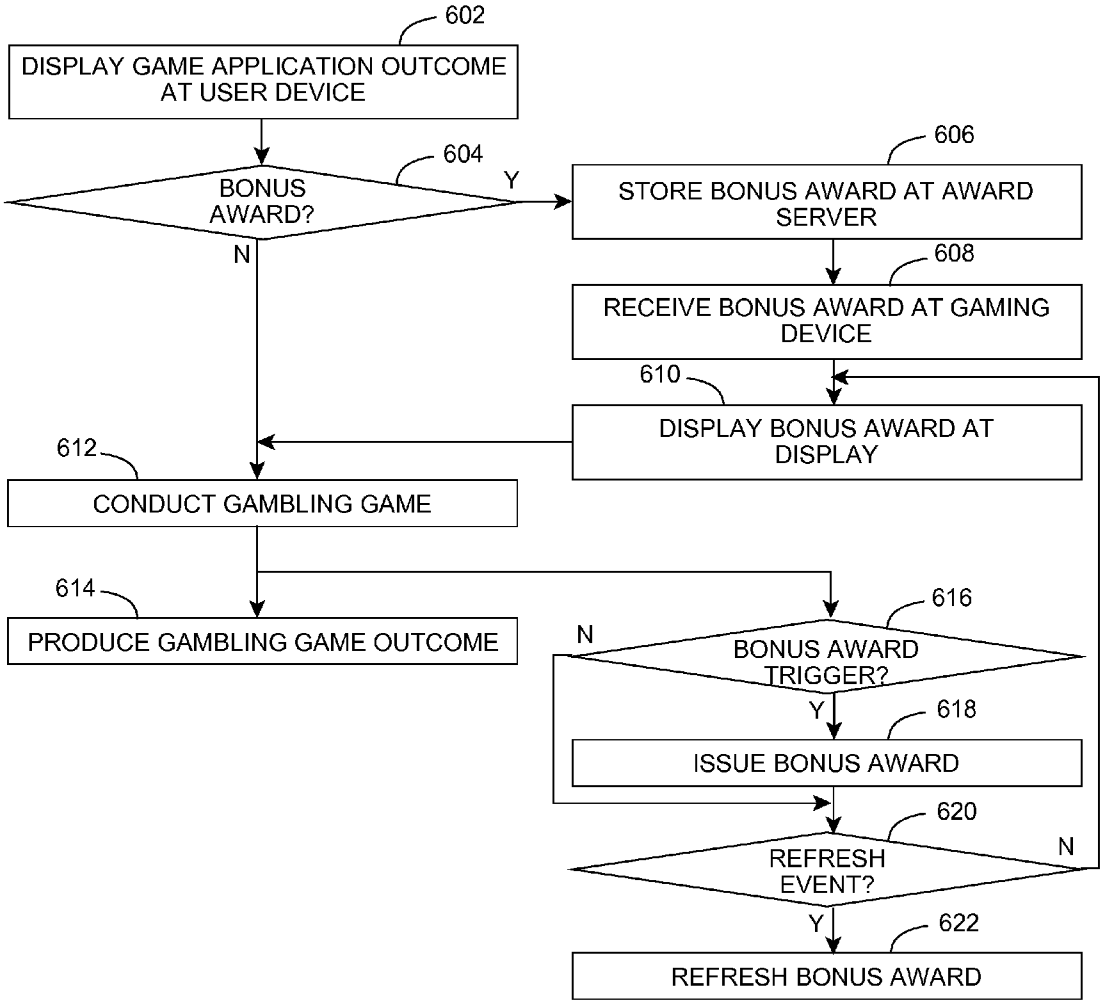
FIG. 6 is a flow chart of a method according to an optional embodiment of the present invention.
Figure 7:
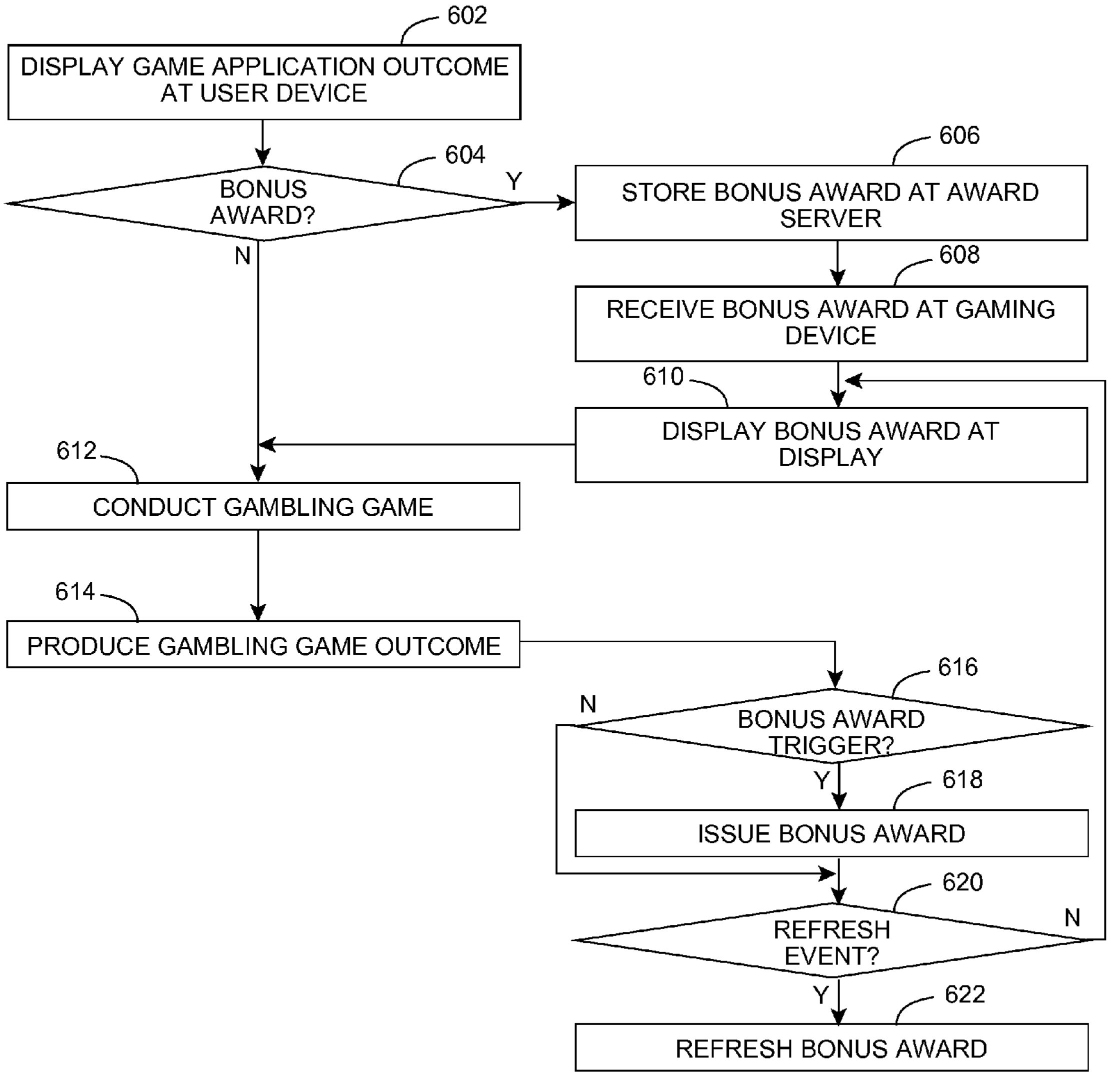
FIG. 7 is a flow chart of a method according to an optional embodiment of the present invention.

For example, referring to FIGS. 3-5, the gaming device 100 communicates with an award server 300 through a network server 200. More specifically, a gaming device 100 communicates via a gaming device communication device 104 to a network server 200 having a network server communication device 204 which, in turn, communicates with an award server 300. As noted above, the network server communication device 204 could take any form, including a modem, NIC, hub, router, or the like. Optionally, the network server 200 includes a network processor (not shown).

In one optional embodiment, shown in FIGS. 3 and 4, the network server 200 acts as an Internet gateway to a world wide web of web servers on the Internet. In such an optional embodiment, the network server 200 may be local, or may be remote such as at an Internet service provider ("ISP"). In another optional embodiment, shown in FIG. 5, the network server 200 may act locally to coordinate communication between a network of gaming devices 100 and an award server 300. For example, the award server 300 may be a server in an intranet or virtual private network ("VPN") serving a network formed by a plurality of network servers 200.

Returning to FIG. 2, the network server 200 may optionally communicate with a database storage device 202 that stores player records. For example, in an optional embodiment, the player records may be player tracking records (also referred to as player accounts, player rewards accounts, player loyalty accounts, or the like). In one such optional embodiment, the player records may be accessible to the network server 200. In a further optional embodiment, the network server 200 may be permitted to read from, write to, or read from and write to the player records.

Referring generally to FIGS. 3-5, the award server 300 may take any form. For example, in an optional embodiment, the award server 300 is a web server accessible through a world wide web of web servers on the Internet. Optionally, the award server 300 is a secure web server that is accessible through a predefined security protocol. Alternatively, the award server 300 is an unsecured web server that is openly accessible. In any case, the award server 300 communicates with the gaming device 100 by transmitting data to, and receiving data from, the gaming device 100. As described above, the transmission and reception of data at the award server 300 may be conducted directly with the gaming device 100 or via a network server 200.

Referring to FIGS. 4 and 5, a user device 400 also communicates with the award server 300, optionally through an ISP or network server 200. A user device 400 may take any form, including a mobile telephone, tablet device, e-reader, personal digital assistant ("PDA"), personal computer, kiosk, arcade game machine, game console, handheld device, electronic gaming device, interactive television, wearable device, global positioning system ("GPS") device, radio frequency identification ("RFID") device, or any other electronic device. In one such optional embodiment, illustrated in FIG. 16, a user device 400 includes a user device processor 402 in communication with a user device display 404 and a user device memory 406. In an optional embodiment, the user device processor 402 also communicates with a user device interface 408. In an optional embodiment, the user device display 404 and user device interface 408 may be integrated into a single device, such as a touch screen. In an optional embodiment, the user device 400 may include a communication device 410, that includes a transmitter and/or a receiver.

The user device 400 is configured to display a game application. In one optional embodiment, the game application may be stored at the user device memory 406 and executed by the user device processor 402. In an alternate optional embodiment, the game application may be stored remotely, i.e., remote from the user device 400, and executed by the user device processor 402. In yet another optional embodiment, the game application may be stored and executed remotely and merely displayed at the user device display 404.

Optional embodiments of methods for configuring and operating a system are illustrated in FIGS. 6-9. An award server 300 communicates with a gaming device 100 and a user device 400. The user device 400, alone or in cooperation with a game server (not shown), conducts and/or displays 602 the outcome of a game application.

For example, in one optional embodiment, a game application is conducted 600 according to a predefined set of game rules. It is contemplated that the game application may utilize any type or form of game rules, including a game of chance (such as reel slot games, card games, dice games, or the like), a skill game (such as trivia games, strategy games, action games, or the like), a skill-chance hybrid game (such as poker or the like), or any other type of game. The conduct of the game application produces an outcome. Again, it is contemplated that the game application may be conducted on the user device 400 or remote from the user device 400, such as at a game server (not shown) in communication with the user device 400.

Based on the outcome 604 of the game application displayed at the user device 400, a bonus award may be earned at the user device 400. However, the bonus award is not issued at the user device 400. Rather, in an optional embodiment, the bonus award is held (or stored) 606 at an award server 300.

In an optional embodiment, discussed in greater detail below, the bonus awards could include monetary amounts, in-kind awards (such as goods, services, vouchers for goods or services, discount coupons, or the like), digital goods (such as music, book, movie, or game downloads), or any other type of award. In an optional embodiment, the user device 400 in communication with the award server 300 may be used to select a bonus award.

For example, in one optional embodiment, the award server 300 may receive data representing input through the user device 400 selecting a good or service as the bonus award. In one optional embodiment, the goods or services selectable as bonus awards may be grouped by the award server 300 based on value or other criteria. In one such optional embodiment, the game application may have many different possible outcomes, with different bonus awards available depending on the outcome obtained through play of the user device 400. The divisions between or among bonus awards may be based on the difficulty (or probability) associated with obtaining the outcome. For example, the most difficult (or least probable) outcomes of the game application may enable selections of bonus awards of greater value, while easier (or more probable) outcomes of the game application may limit selections of bonus awards to those of lesser value.

In one such example, the award server 300 may determine which good and/or services are available to the player for selection based on the outcome of the game application, and the player may be allowed to select from those made available by the award server 300. Thus, in one example, a player with a low-tier outcome may be limited to selecting from a selection of e-books, a player with a medium-tier outcome may be limited to selecting from a selection of e-books and music downloads, while a player with a high-tier outcome may be allowed to select an award from a selection of e-books, music downloads, and movie downloads.

In another optional embodiment, the divisions among bonus awards may be based on the monetary value of the awards. For example, in one such optional embodiment, a player with a low-tier outcome may be limited to selecting from a selection of goods having an award value of up to $20.00, a player with a medium-tier outcome may be limited to selecting from a selection of goods having an award value of up to $50.00, and so forth. In a variation on such an optional embodiment, a player may be allowed to select from a selection of goods each associated with an award value so long as the aggregate value of the selected awards is less than the award amount. In an example of such an optional embodiment, a player obtaining a certain outcome may be issued an award of $100.00 in goods by the award server, thereby permitting the player to select up to $100.00 worth of goods.

In yet another variation on such an optional embodiment, a player may be allowed to select a certain quantity of goods from a selection of goods based on the award issued. For example, a player obtaining a “3 Book” outcome may be permitted to select three e-books a player obtaining a “5 Book” outcome may be permitted to select five e-books, and so forth.

In yet another optional embodiment, a player may be allowed to select any bonus award, but the bonus award will affect the probability of being issued the award later at the gaming device 100. That is, the bonus award is earned, but not issued at the user device 400. The bonus award may be selected at the time it is earned, even though it is not issued by the user device 400. In making a selection, a player may be allowed to select any bonus award. This selection may be stored at an award server 300 and transmitted to a gaming device 100 which would allow the player to actually win the bonus award. In attempting to win the bonus award that was previously selected, the value of the selected bonus award may dictate the probability that the gaming device 100 will issue the bonus award. Thus, a player selecting a high-value bonus award may be required to obtain a relatively low-probability outcome on the gaming device 100 to actually win the bonus award.

In yet another optional embodiment, the award server 300 selects the bonus awards for the player. In one such optional embodiment, the award server 300 stores (or receives) player data and/or game data and uses the player data and/or game data to select bonus awards for the player. In various optional embodiments, the player data received at the award server may be input by the player at the user device 400 or extracted from a player account stored at the award server 300. The player data utilized for the selection of a bonus award may take any form, including the player's residence, shopping preferences, shopping history, gender, age, or the like. In an optional embodiment, the bonus award selection by the award server 300 may also take account of game data, such as the player's game history, the amount/duration/value of play, the player's in-game purchase history, the player's game outcomes, and the like.

The award server 300 communicates with a gaming device 100. As previously discussed, the award server 300 may communicate with the gaming device 100 directly or via a network server 200. A bonus award is received 608 at the gaming device 100 from the award server 300, optionally in response to a player identifier received at the gaming device 100 and transmitted to the award server 300. In an optional embodiment, the bonus award is displayed 610 at a display 1006.

In an optional embodiment in which the selection of a bonus award from the award server 300 takes place from the user device 400, the selected bonus award may be displayed at a display 1006. The display 1006 may be the display of the user device 400, the display of a gaming device 100, a bonus display associated with the gaming device 100 but separate from the main display of the gaming device 100 (such as a top box, secondary display, or the like), a shared bonus display that is shared by multiple gaming devices 100 (such as an overhead community display), or any other display. In an optional embodiment in which a player may earn multiple bonus awards through the user device 100, the bonus awards may be displayed on a bonus selector 1002, such as a mechanical or computer-generated wheel. In this manner, the bonus selector 1002 of the display 1006 would be customized with the player's bonus awards.

In this regard, the gaming device 100 may obtain the player's bonus awards in any manner. For example, in one optional embodiment, a player account may be stored at the award server 300 containing the bonus awards that have been earned by the player at the user device 400. The award server 300 may transmit (or the gaming device 100 may access) the bonus awards associated with the player based on a player identifier associated with the player, such as a player number, account number, player name, or the like.

In one such optional embodiment, a gaming device 100 may access the player account at the award server 300 based on a player identifier supplied by a player. For example, in one optional embodiment, the player identifier may be encoded on a magnetic strip card, RFID transmitter or transceiver, or smart card, or the like. Alternatively or additionally, the player may input the player's account number (or verify the player's account) through a gaming device interface associated with the gaming device 100. Once the player's account at the award server 300 is accessed, the bonus awards earned at, but not issued by, the user device 400 are received at the gaming device 100. In an optional embodiment, one or more of the bonus awards may be displayed at a display 1006 so that the player is aware of the bonus awards that may be awarded through play of the gaming device 100. In an optional embodiment, bonus awards may be transferable between players by submitting a transfer request to the award server 300 and entering each player's player identifier. In one such optional embodiment, the transfer may take the form of sharing, i.e., both players may be allowed the chance to earn the bonus award at a gaming device, while in other optional embodiments, the transfer may result in a full transfer to the receiving player with the transferring player retaining nothing, i.e., the bonus award may be disassociated from the transferring player's player identifier.

A game of chance is conducted 612 at a gaming device 100 for a player. Optionally, the game is of a type in which the outcome of the game is dependent, at least in part, on a random number generated by the random number generator. For example, in a gaming device 100 conducting a card game, the cards dealt may depend, at least in part, on the output of a random number generator. Similarly, in a gaming device 100 conducting a reel slot game, the reel symbols displayed may depend, at least in part, on the output of a random number generator.

In any case, an outcome of the game is produced 614. It is noted that by "outcome," the present invention contemplates any outcome that may be produced in a game. For example, "outcome" may include any occurrence in a game, including a random occurrence, a primary game outcome, or a secondary game outcome that is produced as a result of, contingent upon, or temporally after a primary game outcome is produced. Secondary game outcomes may be produced through such procedures as bonuses for particular outcomes, secondary games, mystery bonuses, random triggers, or any other occurrence apart from the primary game.

The occurrence or non-occurrence of a bonus award trigger determines whether the gaming device 100 issues a bonus award that was received from the award server 300. In one optional embodiment, shown in FIG. 6, the determination 616 of whether a bonus award trigger has occurred is a random event, i.e. the issuance of a bonus award received from the award server 300 is not tied to the outcome of the game. In another optional embodiment, shown in FIG. 7, the determination 616 of whether a bonus award trigger has occurred is based on at least one of the outcomes produced by the gambling game. In response to a bonus award trigger, the bonus award received from the award server 300 is issued 618 at the gaming device 100. In the absence of a bonus award trigger, the bonus award may be held at the gaming device 100 until a refresh event occurs 620. When a refresh event occurs, the bonus award held by the gaming device 100 may be refreshed 622. For example, the bonus award may be replaced by a different bonus award, if any, which was earned through the user device 400 and received at the gaming device 100 from the award server 300. A refresh event may take any form. For example, a refresh event may include a fixed quantity of gambling games, a random quantity of gambling games, a refresh request from the player, or the like.

It should be noted that in an optional embodiment in which the issuance of an award from the award server 300 depends on an outcome of the gambling game, the gambling game may include many other outcomes. These other outcomes may take many forms, including losing outcomes and winning outcomes that are tied to an award, but not a bonus award received from the award server 300. For example, a certain outcome, such as 7 7 7 reel symbols appearing on a reel slot machine pay line may be associated with an award from the award server 300, with the remaining outcomes allocated between losing outcomes, such as mixed reel symbols on a pay line, associated with no award and winning outcomes, such as BAR BAR BAR reel symbols on a pay line, associated with a pay out rather than an award from the award server 300. In another optional embodiment, all outcomes resulting in an award are associated with an award from the award server 300. In yet another optional embodiment, outcomes may be associated with both an award from the award server 300 and a pay out at the gaming device. It is noted that in optional embodiments including pay outs, the pay outs could take any form, including game credits, coin, cash, voucher, or any other form of pay out.

In another optional embodiment, the bonus awards earned at the user device 400 are not specific selections, but merely placeholders. In such an optional embodiment, the actual selection of the bonus award may take place at the gaming device 100 either before or after the bonus award is won through play of the gaming device 100.

Optionally, the issuance of an award from the award server 300 may occur at a time proximate to the player obtaining the outcome associated with the award, or the issuance of the award may be delayed. Similarly, issuance of an award from the award server may occur after the satisfaction of some threshold criterion, such as the accrual of a predetermined quantity of outcomes associated with the issuance of an award from the award server or a the accrual of a predetermined value of outcomes associated with the issuance of an award from the award server. For example, a player may be issued an award from an award server upon obtaining outcomes associated with an award issued by the award server in, for example, at least three games, or a player may be issued an award from an award server upon obtaining outcomes associated with an award from the award server totaling, for example, at least $20.00.

Figure 8:
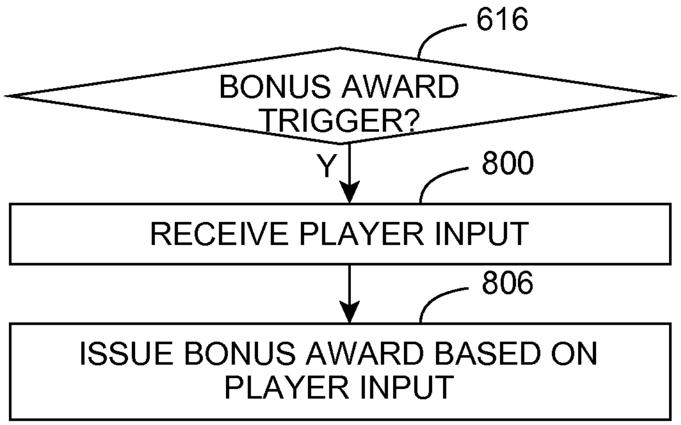
FIG. 8 is a flow chart of a method according to an optional embodiment of the present invention.

In another optional embodiment, shown in FIG. 8, the award server may receive 800 player input via the gaming device and the issuance 806 of an award from the award server may occur at least partially in response to the input by the player. For example, in an optional embodiment, the issuance of an award from the award server may be selectable by a player. In an example of such an optional embodiment, the player may be given a choice of "cashing out" or being issued an award from the award server. If the player inputs a selection to be issued an award from the award server, the award server issues the award. In a further optional embodiment, the input received may additionally include a selection of the award or awards to be issued by the award server. For example, a player may input a selection to be issued an award from the award server, and additionally input a selection of award A (as distinguished from awards B or C).

In another optional embodiment, outcomes associated with awards from the award server may be "banked" in a player record stored at the database storage device. For example, a player obtaining three outcomes associated with an award from an award server may be allowed to store those outcomes in a player record for access at a later time. Similarly, a player obtaining $20.00 in value in outcomes for an award from an award server may be allowed to store that value in a player record for access at a later time. In an optional embodiment, the player may accrue additional outcomes (either in quantity or in value) over time so that the player with, for example, $20.00 in value toward an award from an award server may be allowed to add to that value at a later time by obtaining additional outcomes associated with awards from the award server.

As noted above, the player record may be maintained strictly for awards from the award server, or may be associated with other data, such as player rewards or player tracking data. In an alternate optional embodiment, the outcomes may be stored and tracked using a real or virtual voucher that can be redeemed at a later time. For example, a player may be issued a code in a physical form (such as a receipt or voucher) or in electronic form (such as in an e-mail) that may permit the player to later request issuance of an award through the award server or, in an optional embodiment, accrual of additional outcomes to the balance associated with the code.

It should be noted that while a the award may be issued by the award server as a result of communication from the gaming device, the player may, in an additional or alternate embodiment, be permitted to select and prompt issuance of the award apart from the gaming device, e.g. at a redemption device in the form of a home computer, kiosk, redemption center, or the like. In such an optional embodiment, the step of determining whether a bonus award trigger has occurred through conduct of the game at the gaming device 100 is separated from the issuance 900 of the bonus award stored at the award server 300, which could occur at a separate time and as a result of a communication to the award server 300 from something other than the gaming device 100, as shown in FIG. 9.

Figure 9:
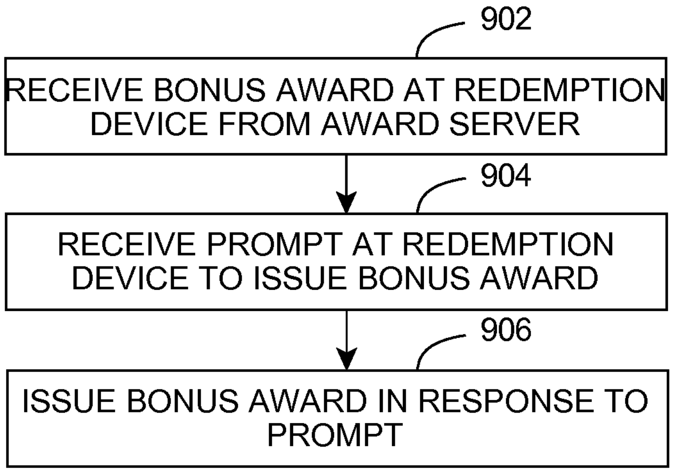
FIG. 9 is a flow chart of a method according to an optional embodiment of the present invention.
Figure 10:
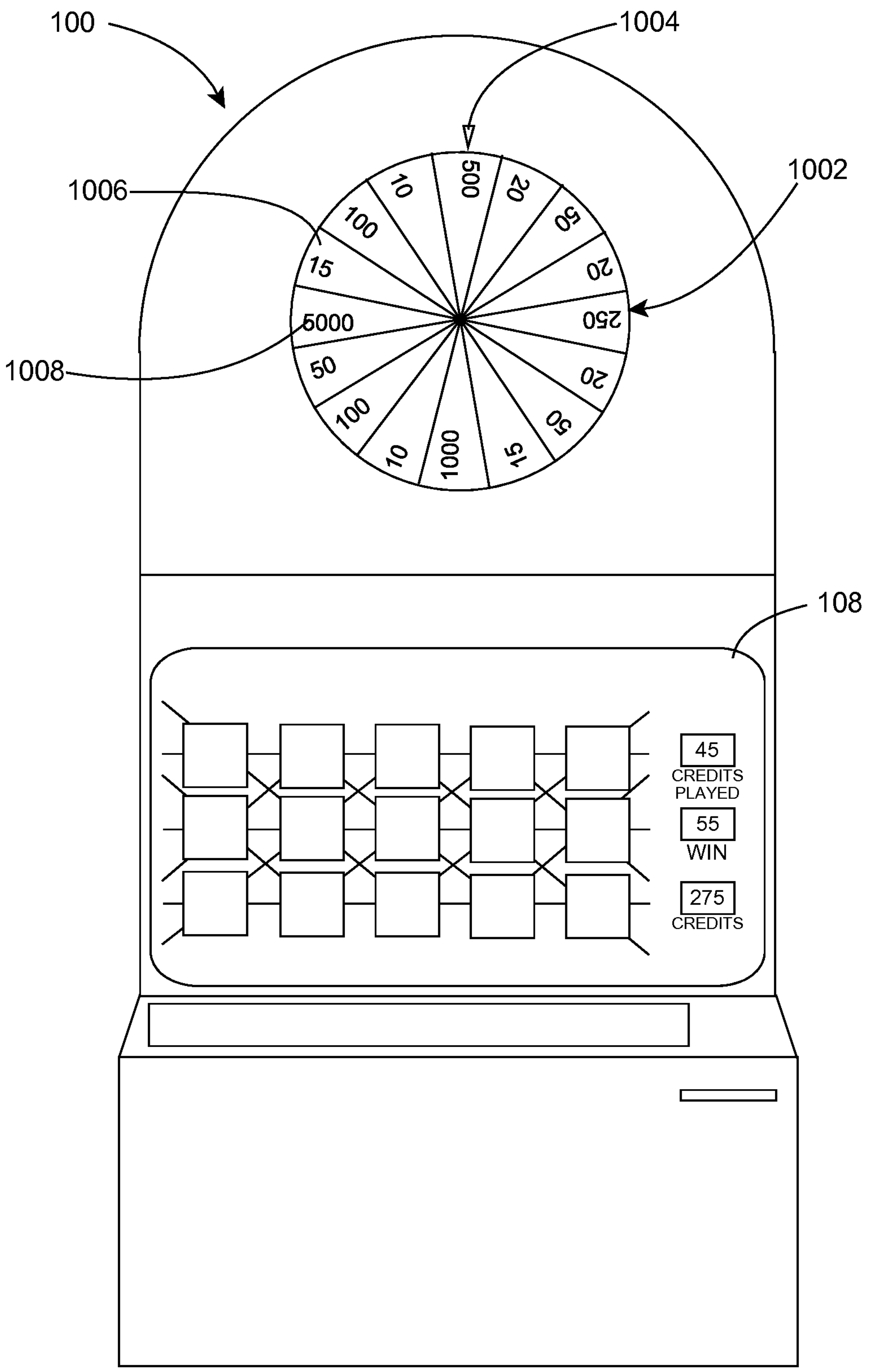
FIG. 10 is a front view of a gaming machine and bonus selection apparatus according to an embodiment of the present invention.
Figure 15:
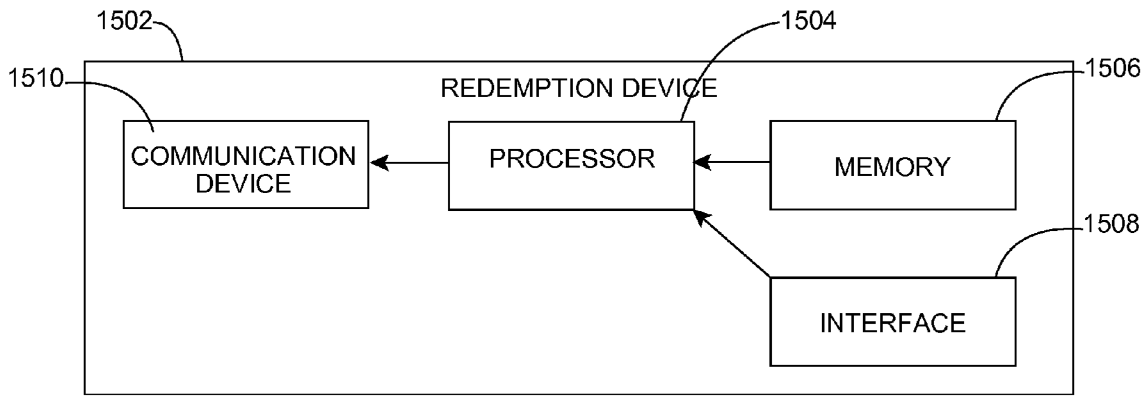
FIG. 15 is a block diagram of a redemption device according to an embodiment of the present invention.
Figure 16:
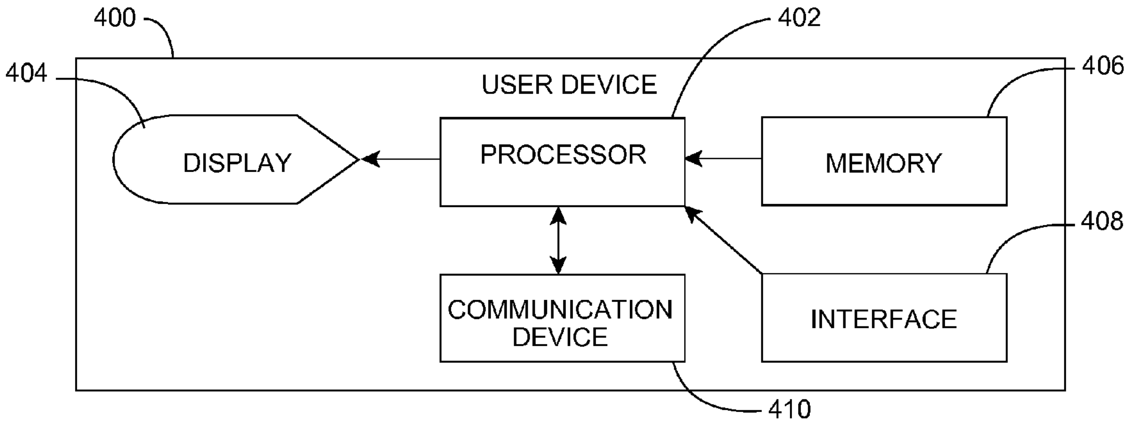
FIG. 16 is a block diagram of a user device according to an embodiment of the present invention.

In one such system, illustrated in FIGS. 9 and 15, a redemption device 1502 may include a redemption device memory 1506 which stores program instructions executable by a redemption device processor 1504. The redemption device 1502 may be a separate device. Alternatively, the redemption device 1502 may be integral with the user device 400, gaming device 100, award server 300, or the like. The redemption device 1502 receives 902 a bonus award from an award server 300, optionally through a redemption device communication device 1510. As described above, the bonus award was earned, but not issued, at a user device 400. The redemption device 1502 also receives 904 a prompt for issuance of a bonus award. In an optional embodiment, the prompt may identify a specific bonus award to be redeemed. In an optional embodiment, the redemption device 1502 receives the prompt from a user device 400 (either directly or via an award server 300). In an alternate optional embodiment, the prompt may be manually entered through a redemption device interface 1508 in communication with the redemption device processor 1504. In response to the prompt, the redemption device issues 906 the bonus award.

In a variation on such an optional embodiment, the outcomes associated with an award through the award server may be stored and tracked through a third-party system accessible to the player through the Internet. For example, a third party financial services system may track the quantity or value of outcomes associated with an award from the award server.

Referring generally to FIGS. 6-9, the awards and the issuance of the awards from the award server may take any form. For example, the award may be a good or service. In one such optional embodiment, the player exchanges the outcome for the good or service. In one such optional embodiment, the award server may receive data that at least represents the outcome obtained. Thus, in an example of such an optional embodiment in which the prizes awarded relate to travel, a player with a first outcome may be awarded a discount for an airplane ticket by the award server, a player with a second outcome may be awarded a free airplane ticket to a domestic destination by the award server, and a player with a third outcome may be awarded a free airplane ticket to an international destination by the award server. Optionally, the distinction among the various outcomes would be the expected value of the outcome, e.g. the statistical frequency of the outcome compared to its value, so that, in such an example, the third outcome would occur less frequently than the second outcome, and the second outcome would occur less frequently than the first outcome.

As noted above, the award server may receive data representing input by the player selecting a good or service to exchange for the outcome associated with the award. Thus, in one optional embodiment in which the awards may be segregated by the award server, the award server may determine which awards are available to the player for selection based on the quantity or value of the outcome, and the player may be allowed to select from the available group of awards. Thus, in one example, a player with a first outcome may be limited to selecting from a selection of books, a player with a second outcome may be limited to selecting from a selection of books and CDs, while a player with a third outcome may be allowed to select an award from a selection of books, CDs, and DVDs.

In another optional embodiment, the divisions among awards may be based on the monetary value of the awards. For example, in one such optional embodiment, a player with a first outcome may be limited to selecting from a selection of goods having an award value of up to $20.00, a player with a second outcome may be limited to selecting from a selection of goods having an award value of up to $50.00, and so forth.

In a variation on such an optional embodiment, a player may be allowed to select from a selection of goods each associated with an award value so long as the value of the selected awards is less than the award amount. In an example of such an optional embodiment, a player obtaining a certain outcome may be issued an award of $100.00 in goods by the award server, thereby permitting the player to select up to $100.00 worth of goods.

In yet another variation on such an optional embodiment, a player may be allowed to select a certain quantity of goods from a selection of goods based on the award issued. For example, a player obtaining a first outcome may be permitted to select three CDs, a player obtaining a second outcome may be permitted to select five CDs, and so forth.

In another optional embodiment, the award server receives wager data and outcome data and uses the data to segregate the awards. For example, in one optional embodiment, a player wagering a certain wager amount who obtains an outcome rewarded by the award server may be rewarded with a less valuable award than a player who obtains the same outcome, but wagers a different wager amount. In one optional embodiment, the award varies proportionally with wager amount so that players wagering greater amounts are rewarded with awards having a proportionally greater value. It is noted that wagering data may merely include total wager, or may include such wager parameters as the number of pay lines or hands played, the wager on each pay line or hand, the denomination of the coins, or other wager information, so that such wager parameters may be taken into account in determining which award to issue to a player.

In yet another optional embodiment, the award server receives player data and outcome data and uses the player data to preferentially offer certain awards. In various optional embodiments, the player data received at the award server may be input by the player at the gaming device or extracted from player records (as described above). For example, in one optional embodiment, the award server may receive player data regarding the player's residence and reward, or offer to reward, the player with awards specific to the player's geographic residence, e.g. events near the player's residence, goods or services obtained from vendors near the player's residence, and the like. In another example, the award server may receive player data regarding the player (such as shopping preferences, gender, age, or the like, and reward, or offer to reward, the player with awards relating to the player data. In any such optional embodiment, the awards may also be segregated by value, so any player data would be combined with wager data and/or outcome data to define a set of one or more awards issued or offered to the player that, optionally, vary with, for example, total wager, pay lines or hands played, wager per pay line or hand, coin denomination, or the like.

In an optional embodiment, the award has some monetary value that can be transferred electronically by the award server. For example, in an optional embodiment, the player exchanges the outcome for a monetary award from the award server. In one such optional embodiment, the award may include the transfer of a monetary award from the award server to a bank account, credit card account, or credit account, to a stored value card (such as a gift card), to an account maintained for the player by the operator of the game (such as the casino or hotel), to a vendor in exchange for goods or services, or the like. In an optional embodiment, the award server may receive data representing input by the player directing how the monetary award is to be transferred (including, in an optional embodiment, where or to whom the transfer occurs). For example, in one such optional embodiment, the input may include an account number, personal identification number ("PIN"), or similar information allowing the player to effect a transfer of the award from the award server directly to the account identified.

Turning, then, to a more concrete example, in an optional embodiment, a player may place a wager to play a game at the gaming device. The wager may be made in any manner, including allocating the wager from game credits stored at the gaming device or depositing the wager through a wager handling device in the form of currency, voucher, printed ticket, stored value card, or the like.

The game is conducted for the player according to a predefined set of game rules. The game may take any form, including a card game, a reel slot game, a tile game, dice game, a roulette game, or any other game in which the outcome is determined, at least in part, by a randomly determined event at the game processor in the gaming device. The game produces an outcome. For example, an outcome could be a hand of cards, arrangements of slot reel symbols on defined pay lines, or the like, depending on the game. Similarly, the outcome could be a secondary game outcome such as a bonus screen, secondary game, wheel game, or other type of bonus game or bonus selection process.

A determination is made whether to issue an award from the award server. In one optional embodiment, the determination is made independent of the outcome. That is, in such an optional embodiment, the determination is made randomly in a way that is separate from the outcome. In such an optional embodiment, the player becomes eligible to have an award issued from the award server in a random fashion.

In another optional embodiment, the determination is made in response to an outcome obtained in the game. Thus, in such an optional embodiment, a player obtaining a particular outcome, such as a particular hand of cards, or a particular arrangement of slot reel symbols, or the like, may be eligible to receive an award from the award server.

In an optional embodiment, the gaming device communicates through the network server to the award server that an award is to be issued from the award server. Again, as discussed above, this may occur automatically or upon input from the player. Similarly, as discussed above, this may occur immediately or may be delayed or may occur on demand from the player. As noted above, the actual transmission of the communications between the gaming device and the award server via the network server may be conducted via the world wide web on the Internet, through an intranet, or other computer network.

In an optional embodiment, the gaming device includes a display that is generated in response to data received from the award server directly or via a network server. For example, the display may display the award issued by the award server. In an optional embodiment in which the award is issued in response to input received from the player via an input device, the display may include award options, delivery options, or the like. The player may input the player's selection through the input device. The input is received at the award server and the award is issued in conformity with the input.

For example, in one such optional embodiment, a player may be presented with a display listing award options, such as books, CDs, DVDs, or like awards offered by the award server, as well as delivery options, such as delivery to the hotel, delivery to the player's home, or like delivery options. The player inputs his or her selections at the gaming device, for example, a book on casino gambling delivered to the player's house, and the selections are received at the award server so that the award can be issued accordingly.

In another example of such an optional embodiment, a player may be presented with a display informing the player of an award having a monetary value and options for receiving the monetary value, such as deposit to a bank account, payment to a credit line or credit account, credit to the player's hotel bill, deposit to a stored value card, cash-out, or the like. If the player inputs certain selections, such as a transfer to a bank account, credit line or credit account, or hotel bill, the player may be prompted for additional input such as the player's bank account number and bank routing number, credit account number, hotel room number, or the like. The input is received at the award server and the award is issued.

In another optional embodiment, awards may be segregated. The award server determines which award or awards for which the player may be eligible. In one optional embodiment, the determination is random; in another optional embodiment, the award server receives data, such as player data, outcome data, wager data, or other data, and determines which award or awards are available to the player based, at least in part, on the data received. For example, such factors affecting the eligibility for certain prizes may include the outcome obtained by the player, the wager by the player, the wager history of the player, personal information about the player (e.g. age, gender, geographic residence, or the like), or other information. It is noted that the data may be received from the gaming device or through input at the gaming device or from some other source, such as player records stored at a database. The award or awards available to the player may be issued, or the player may be allowed to enter a selection of the award.

As previously discussed, the issuance of certain awards may include the receipt of input from a player at the gaming device that is transmitted to the award server. For example, in an optional embodiment, the award may include the transfer of an award from the award server to an account (such as bank account, credit card account, credit account, deposition account, stored value card, or the like) at a third party financial server. In one such optional embodiment, a method may include receiving account data as input at the gaming device, and transmitting the account data to the award server to effect the transfer of the award from the award server to the third party financial server. For example, a player may be prompted to enter an account number, PIN, or other identifying data used at the award server to transfer the award to the designated account. In an optional embodiment, the transfer may be effected through an electronic funds transfer, credit transaction, or similar electronic transaction.

As noted above, in an optional embodiment, the present invention may also be directed to bonus awards in addition to, or in place of, base game awards. For example, as shown in FIGS. 10-13, in one optional embodiment, a bonus selection apparatus 1002 may be provided. The bonus selection apparatus 1002 may take any form. For example, in one optional embodiment, the bonus selection apparatus 1002 is a wheel, reel, sphere, or similar device that is rotatable or movable with respect to an indicator 1004 that identifies a selected segment. Similarly, in another optional embodiment, the bonus selection apparatus 1002 is a light board, display, or similar device in which a frame or highlight (not shown) identifies a selected segment.

The bonus selection apparatus 1002 includes a bonus display. The bonus display 1006 includes a display of bonus award indicia 1008 associated with bonus awards selectable by the bonus selection apparatus 1002. For example, in one optional embodiment in which the bonus selection apparatus 1002 includes a rotatable bonus display 1006 with the bonus award indicia 1008 displayed in segments on the rotatable bonus display 1006. In another optional embodiment, the bonus selection apparatus may include a stationary bonus display 1006 with the bonus award indicia 1008 arrayed proximate to a movable indicator 1004.

With continued reference to FIGS. 10-13, the bonus display 1006 is changeable based on bonus award indicia 1008 transmitted from an award server 300. That is, at least one bonus award indicium 1008 is received at the bonus selection apparatus 1002 from the award server 300. In this regard, the award server 300 may communicate with the bonus selection apparatus 1002 directly or, as shown in FIGS. 10-13, via the game processor 102. The bonus award indicia 1008 are displayed at the bonus display 1006 at the bonus selection apparatus 1002.

The selection of bonus award indicia 1008 for display at the bonus display 1006 may be random, or may be based on one or more factors. For example, in one optional embodiment, wager data are transmitted from the game processor 102 of the gaming device to the award server 300, and the award server 300 selects available bonus awards based, at least in part, on the wager data and transmits the bonus award indicia 1008 associated with those available bonus awards to the bonus selection apparatus 1002, optionally via the gaming device, for display at the bonus display 1006. Thus, in one such optional embodiment, the bonus award indicia 1008 appearing at the bonus selection apparatus 1002 could depend, at least in part, on the player's wager size, wager denomination, or the like.

In another example, the bonus award indicia 1008 displayed at the bonus selection apparatus 1002 may depend on an outcome generated in the base game. In one such example, outcome data are transmitted from the gaming device 100 to an award server 300. The award server 300 selects available bonus awards based, at least in part, on an outcome in the base game, and transmits bonus award indicia 1008 associated with those available bonus awards to the bonus selection apparatus 1002, e.g. directly or via the gaming device 100, for display at the bonus display 1006.

In yet another example, the bonus award indicia 1008 displayed at the bonus selection apparatus 1002 depend on a player-selected parameter in the base game. Examples of such player-selected parameters would depend on the base game and could include such parameters as the number of active pay lines or the wager allocation to one or more pay lines in a reel slot game, the number of active card hands in a card game, or the like. In such an optional embodiment, data representing the player-selected parameter are transmitted to an award server 300 which, in turn, selects available bonus awards based, at least in part, on the player-selected parameter. Bonus award indicia 1008 associated with the available bonus awards are transmitted to the bonus selection apparatus, e.g. directly or via the gaming device 100, for display at the bonus display 1006.

Figure 11:
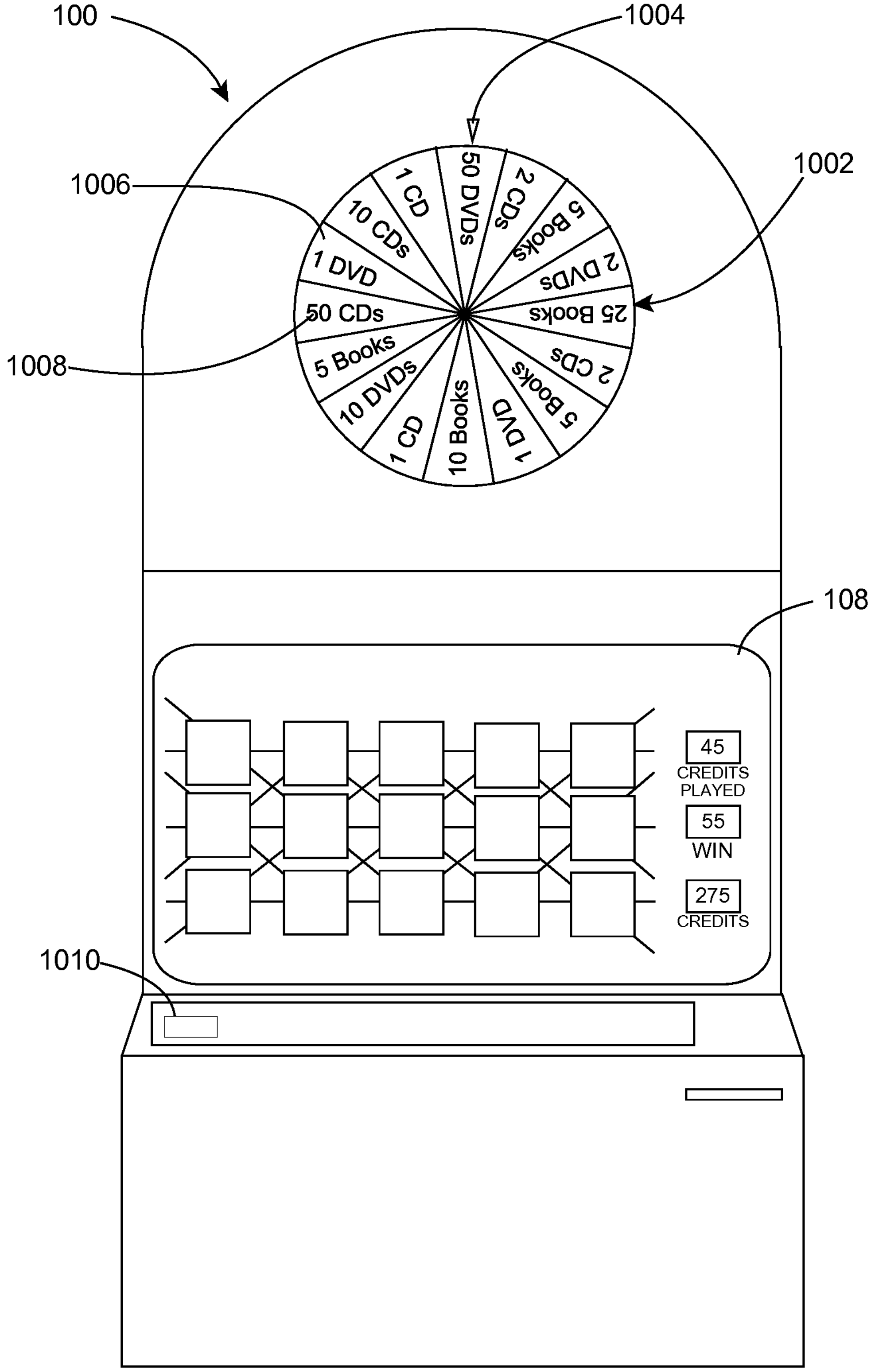
FIG. 11 is a front view of a gaming machine and bonus selection apparatus according to an embodiment of the present invention.
Figure 12:
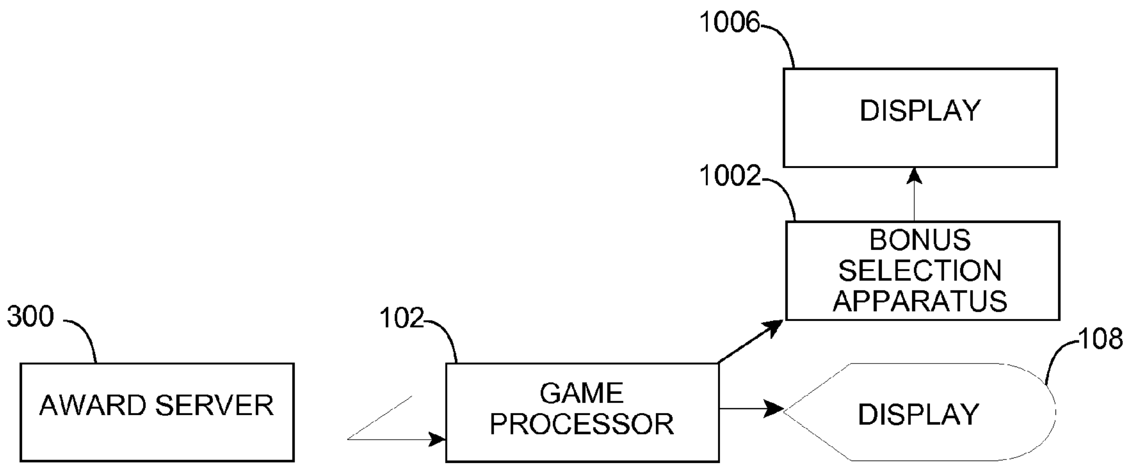
FIG. 12 is a block diagram of a system according to an embodiment of the present invention.
Figure 13:
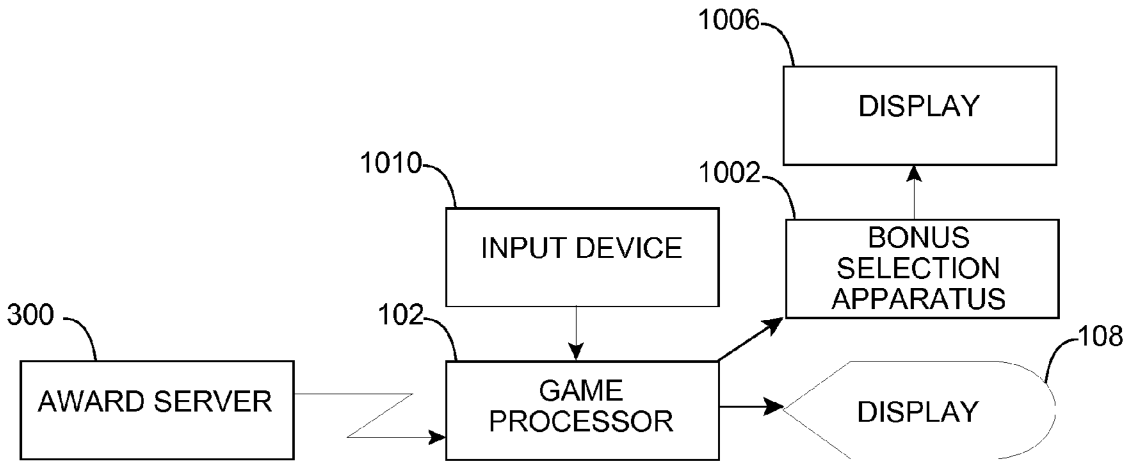
FIG. 13 is a block diagram of a system according to an embodiment of the present invention.

In another example shown in FIGS. 11 and 13, the bonus award indicia 1008 displayed at the bonus display 1006 of the bonus selection apparatus 1002 are selected by an award server 300 based on input from the player. In one such optional embodiment, the gaming device 100 includes an optional input device 1010 communicating with the game processor 102. Input is received from the player through the input device 1010 and transmitted to the award server 300. The award server 300 selects available bonus awards based, at least in part, on the input. Bonus award indicia 1008 associated with the available bonus awards are transmitted to the bonus selection apparatus 1002, e.g. directly or via the gaming device 100, for display at the bonus display 1006.

In such an optional embodiment, the input may take many different forms. For example, in one optional embodiment, the input may relate directly to the type or form of the bonus awards for which the player wishes to play. Thus, in one example, the gaming device 100 or award server 300 may present a player with a selection of different categories of prizes, such as books, DVDs, CDs, travel awards, event tickets, or other categories. In one such optional embodiment, the player selects a category of prize using the input device 1010. The award server 300 selects bonus awards from the selected category and transmits bonus award indicia 1008 to represent the available bonus awards on the bonus display of the bonus selection apparatus 1002.

As discussed in greater detail below, and with reference generally to FIG. 14, a method according to an embodiment of the present invention includes populating a bonus selection apparatus with bonus award indicia from an award server. That is, a bonus selection apparatus includes a bonus display displaying a plurality of bonus award indicia. The bonus awards associated with the bonus award indicia could take any form, such as tangible prizes, nominal-value incentives, game credit awards, free spins, or any other form of award. As discussed in greater detail below, the bonus award indicia displayed at the bonus selection apparatus represent the bonus awards available for the player to win. In an optional embodiment, a second step of bonus selection is required before an available bonus award is issued to the player.

The bonus award indicia populating the bonus display are transmitted from an award server. In an optional embodiment, the bonus award indicia are selected from an inventory of bonus awards. In such an optional embodiment, the bonus award indicia selected for the bonus display may be selected in any manner. For example, in one optional embodiment, the bonus award indicia are selected randomly. That is, in one optional embodiment, bonus award indicia associated with a random selection of bonus awards are transmitted to the bonus display.

In another optional embodiment, the bonus award indicia are selected based on one or more factors. For example, in one optional embodiment, a factor could include a characteristic of the wager placed such as the size of the wager, the denomination of the wager, the way the wager is allocated to propositions in the game, or other wager characteristics. In this manner, the bonus awards available to a player who triggers a bonus selection may vary depending on the player's wager or handling of the player's wager.

In another example, a factor could include the outcome of the wagering game. Thus, in such an optional embodiment, the bonus awards available and the bonus award indicia displayed could vary depending on the outcome in a game or series of games.

In yet another optional embodiment, a factor could include one or more player-selectable game parameter. The player-selectable game parameter could vary depending on the game. For example, in a reel slot game the number of active pay lines may be selectable by the player. Similarly, in a card game, the number of active hands may be selectable by the player. Player-selectable game parameters could also include player selections made during game play. For example, in a card game, the number of cards held or discarded, the number of hole (or community) cards used to form a hand, the number of additional cards taken in Blackjack or Baccarat, the rank of a sub-hand in Pai Gow or Pai Gow Poker, or any other player selection that may occur in the course of a game. In these examples, the bonus award indicia displayed at the bonus selection apparatus could depend on game parameter selected by the player, so that the bonus awards available to be awarded may depend on the player's conduct of the game.

In yet another optional embodiment in which the gaming device includes an input device, the bonus award indicia selected for display at the bonus selection apparatus may vary depending on input received from the player and transmitted to the award server. The input and selection based on the input may vary depending on the particular embodiment. It is contemplated that the input could include any form of input, such as a selection of a category, size, preference, type, or other characteristic of a bonus award. For example, in one optional embodiment, the input includes a selection of a category of bonus awards and the bonus award indicia displayed at the bonus selection apparatus may come from the selected category. Thus, in one example, a player may be presented with categories of "Entertainment" and "Travel." The award server may transmit bonus award indicia representing show tickets, DVDs, CDs, and books if the player selects the "Entertainment" category or bonus award indicia representing airplane tickets and hotel vouchers if the player selects the "Travel" category. Such an example would allow a player to select the type of prizes the player wishes to play for.

Figure 14:
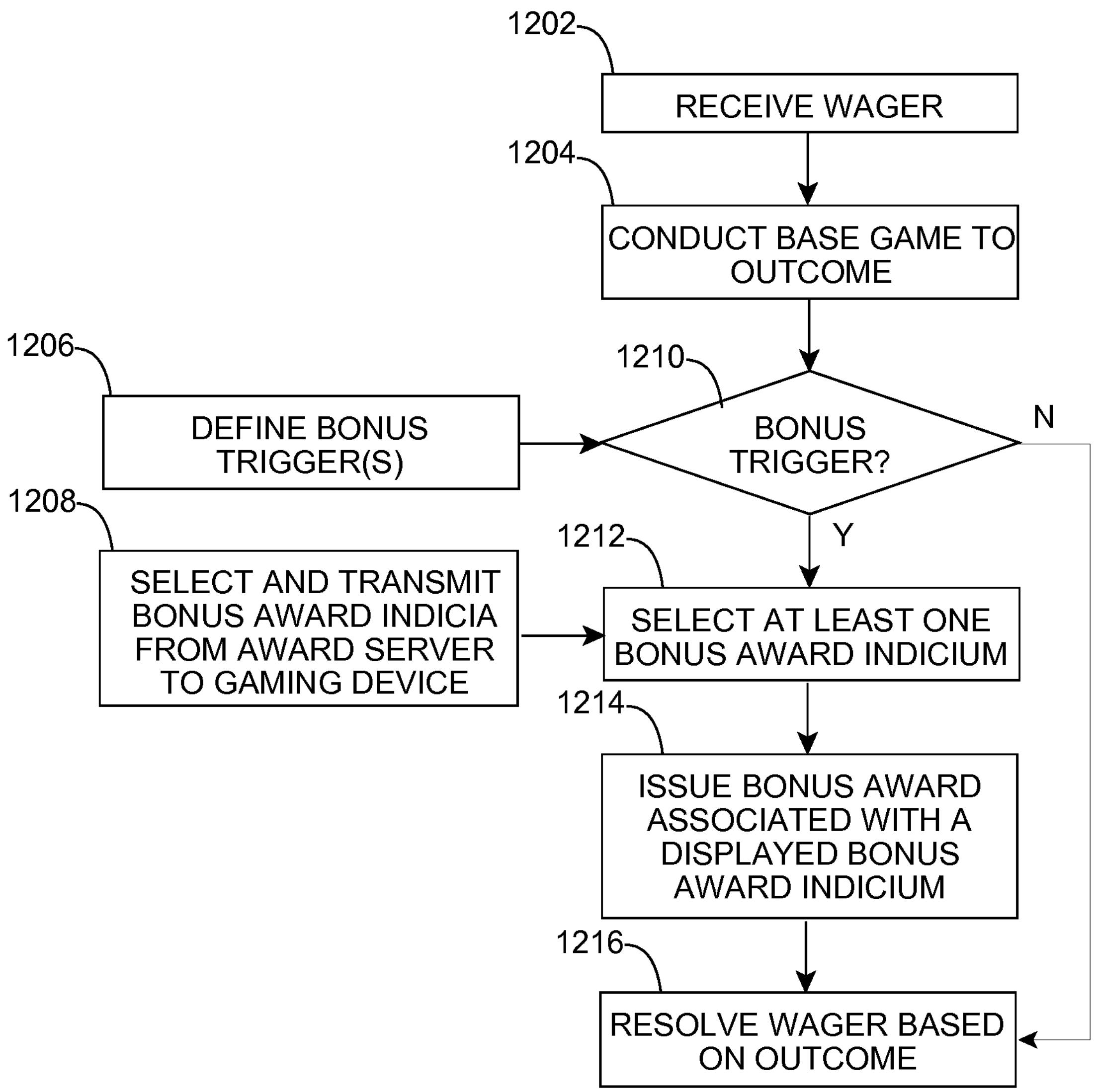
FIG. 14 is a flow chart of a method according to an optional embodiment of the present invention.

With continued reference to FIG. 14, an embodiment of the present method includes a base game. It is contemplated that the selection and transmission 1208 of bonus award indicia from the award server for display at the bonus selection apparatus may occur before, after, or during the conduct 1204 of a base game. Similarly, it is contemplated that a selection and display of bonus award indicia may be refreshed with each base game, may persist over several base games, may be refreshed upon request by the player, may be refreshed randomly, or may be altered, renewed, changed, or refreshed in any other manner. In yet another optional embodiment, bonus award indicia may be refreshed singly or in series rather than in a group. For example, as a bonus award indicium is selected, it may be removed from the bonus display at the bonus selection apparatus and replaced with another bonus award indicium.

Optionally, a base game is conducted 1204 in response to the receipt 1202 of a wager from a player. The base game is conducted 1204 to generate an outcome. In an optional embodiment, the outcome may take the form of a winning outcome, a losing outcome, or, in certain games, a push outcome. The wager is resolved 1216 based, at least in part, on the outcome in the base game.

A bonus selection occurs in response to a bonus award trigger 1210. In an optional embodiment, it is contemplated that certain criteria may need to be satisfied for a bonus trigger to occur. For example, a player may be required to place a minimum wager in the base game or place a separate bonus wager to be eligible to trigger a bonus.

The bonus award trigger could be defined 1206 in many different ways. For example, a bonus trigger could occur randomly. That is, the bonus award trigger may occur independent of the base game. In a further optional embodiment, the bonus trigger may be contingent on an additional criterion or criteria, such as a minimum wager size, so that the bonus award trigger occurs randomly only in those games where the additional criterion or criteria are met.

In another optional embodiment, the bonus trigger may depend, at least in part, on the outcome of the base game. That is, in one such optional embodiment, a designated outcome may trigger a bonus. The outcome triggering the bonus may vary depending on the game. For example, the outcome triggering a bonus may be a winning outcome, a losing outcome, an outcome with a designated combination of reel symbols or cards, an outcome with a designated pattern of symbols or cards, a series of designated outcomes over a series of base games, or the like.

A bonus selection includes randomly selecting 1212 at least one bonus award indicium from among the bonus award indicia displayed at the bonus selection apparatus. It is contemplated that the bonus selection may take any form. In certain optional embodiments, the bonus selection may depend on the form of the bonus selection apparatus.

For example, in the figures, the bonus selection apparatus may take the form of a wheel with bonus award indicia displayed on segments of the wheel and an indicator. In such an optional embodiment, a bonus trigger could cause the wheel to move relative to the indicator. In one such optional embodiment, a bonus award indicium is selected when the segment on which the bonus award indicium is displayed aligns with the indicator when the relative motion stops.

The bonus award associated with the selected bonus award indicium is issued 1214 to the player. The bonus award may be issued at the gaming device. For example, certain bonus awards such as game credits, coupons, vouchers, cash, tangible prizes, or the like may be delivered at the gaming device. In another optional embodiment, certain bonus awards may not be delivered at the gaming device. For example, in an optional embodiment in which the bonus awards include tangible objects, the bonus award may be delivered to the player's hotel room or other physical address. As discussed above with respect to another optional embodiment, the player may enter an address or other contact information, e.g. electronic mail address, telephone or facsimile number, or the like, so that the bonus award may be delivered to the player.

Similarly, in an optional embodiment, a selection by the player may be received at an award server, such as through an input device at the gaming device. For example, if the bonus award indicium selected by the bonus selection apparatus is "10 Books," the player may input a selection of ten titles that the player wishes to receive. Similarly, if the bonus award indicium selected by the bonus selection apparatus is "1 Airline Ticket," the player may input a selection, such as a flight destination, flight date, airline, or the like, and the award server may issue or arrange the issuing of the bonus award taking into account the selection input, to the extent possible. The award server may direct the issuing of the award, such as through arranging delivery of the bonus award, arranging the ordering of the bonus award on behalf of the player, issuing a certificate redeemable for the selected bonus award, or the like.

While certain embodiments of the present invention have been shown and described it is to be understood that the present invention is subject to many modifications and changes without departing from the spirit and scope of the claims presented herein.

We claim:

1. A gaming system comprising:

a user device comprising:

a user device processor;

a user device display; and a user device memory in communication with said user device processor, said user device memory configured to store program instructions executable by said user device processor to display an outcome of a game application at said user device display, wherein said outcome of said game application may include a bonus award which is earned through said game application without issuing said bonus award at said user device;

an award server in communication with said user device comprising:

an award server processor; and an award server memory in communication with said award server processor, said award server memory configured to store program instructions executable by said award server processor to receive said bonus award from said user device and store said bonus award in association with a player identifier;

a display; and at least one gaming device in communication with said award server and said display, said at least one gaming device separate from said award server and operating independently from said award server, comprising:

a gaming device processor including a random number generator, said random number generator configured to generate a random number used, at least in part, to generate an outcome for a gambling game;

a gaming device interface in communication with said gaming device processor; and a gaming device memory in communication with said gaming device processor configured to store at least one bonus award trigger and program instructions executable by said gaming device processor to conduct the steps of:

receiving said bonus award from said award server;

displaying a bonus indicium associated with said bonus award on said display;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one bonus award trigger has occurred; and issuing said bonus award at said at least one gaming device when said at least one bonus award trigger occurs.

2. The system of claim 1 wherein said award server and said gaming device processor are configured to execute program instructions to conduct the steps of:

receiving player input through said gaming device interface;

communicating said player input from said gaming device processor to said award server; and dynamically selecting by said award server at least one bonus award indicium for display at said display, wherein said at least one bonus award indicium selected for display at said display is selected by said award server at least partially in response to said player input and said bonus award earned at said user device, and wherein said bonus award indicium is changeable by said award server in response to changes in said player input.

3. The system of claim 1 wherein said program instructions executable by said user device processor further comprise:

receiving at least one selection of a bonus award when said outcome of said game application includes a bonus award; and transmitting said bonus award selection to said award server.

4. The system of claim 3 wherein said step of receiving at least one selection of a bonus award comprises:

receiving a plurality of possible bonus awards at said user device;

displaying said plurality of possible bonus awards at said user device display; and receiving player input at said user device processor selecting at least one of said possible bonus awards which was earned through said game application but not issued at said user device.

5. The system of claim 1 wherein said bonus award is associated with a player identifier and said program instructions executable by said gaming device processor further comprise:

receiving a player identifier through said gaming device interface such that said bonus award received from said award server is a bonus award associated with said player identifier received at said gaming device;

storing at least one display refresh event in said gaming device memory, wherein said display refresh event includes removal of said player identifier received at said gaming device such that said bonus award is available to be issued only in gambling games conducted while in receipt of said player identifier associated with said bonus award; and holding said bonus award at said display until the occurrence of said at least one bonus award trigger or said at least one display refresh event, whichever occurs first.

6. The system of claim 5 wherein said display refresh event includes a predefined quantity of gambling games such that said bonus award is available to be issued for only said predefined quantity of gambling games.

7. The system of claim 5 wherein said display refresh event includes a random quantity of gambling games such that said bonus award is available to be issued for only said random quantity of gambling games.

8. The system of claim 1 wherein said bonus award trigger is determined, at least in part, by said outcome of said gambling game generated by said gaming device processor.

9. The system of claim 1 wherein said bonus award trigger is independent of said outcome of said gambling game generated by said gaming device processor.

10. The system of claim 1 wherein said program instructions executable by said award server processor further comprise:

receiving a transfer request at said award server including a first player identifier associated with a bonus award and a second player identifier; and associating said bonus award with said second player identifier by said award server processor in response to said transfer request.

11. The system of claim 1 further comprising a redemption device in communication with said award server comprising:

a redemption device processor; and a redemption device memory in communication with said redemption device processor configured to store program instructions executable by said redemption device processor to conduct the steps of:

receiving said bonus award from said award server; receiving a prompt to issue said bonus award at said redemption device; and issuing said bonus award at said redemption device in response to said prompt.

12. A system comprising:

a user device comprising:

a user device processor; a user device display; and a user device memory in communication with said user device processor, said user device memory configured to store program instructions executable by said user device processor to display an outcome of a game application at said user device display, wherein said outcome of said game application may include a bonus award which is earned through said game application without issuing said bonus award at said user device;

an award server in communication with said user device comprising:

an award server processor; and an award server memory in communication with said award server processor, said award server memory configured to store program instructions executable by said award server processor to receive said bonus award from said user device and store said bonus award in association with a player identifier;

a display; and at least one gaming device in communication with said award server and said display, said at least one gaming device separate from said award server and operating independently from said award server, comprising:

a gaming device processor including a random number generator, said random number generator configured to generate a random number used, at least in part, to generate an outcome for a gambling game;

a gaming device interface in communication with said gaming device processor; and a gaming device memory in communication with said gaming device processor configured to store at least one bonus award trigger and program instructions executable by said gaming device processor to conduct the steps of:

receiving a player identifier through said gaming device interface;

retrieving at least one bonus award associated with said player identifier from said award server;

displaying a bonus indicium associated with said at least one bonus award on said display;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one bonus award trigger has occurred; and issuing said at least one bonus award at said at least one gaming device when said at least one bonus award trigger occurs.

13. The system of claim 12 wherein said award server and said gaming device processor are configured to execute program instructions to conduct the steps of:

receiving player input through said gaming device interface;

communicating said player input from said gaming device processor to said award server; and dynamically selecting by said award server at least one bonus award indicium for display at said display, wherein said at least one bonus award indicium selected for display at said display is selected by said award server at least partially in response to said player input and said bonus award earned at said user device, and wherein said bonus award indicium is changeable by said award server in response to changes in said player input.

14. The system of claim 12 wherein said program instructions executable by said user device processor further comprise:

receiving at least one selection of a bonus award when said outcome of said game application includes a bonus award; and transmitting said bonus award selection to said award server.

15. The system of claim 14 wherein said step of receiving at least one selection of a bonus award comprises:

receiving a plurality of possible bonus awards at said user device;

displaying said plurality of possible bonus awards at said user device display; and receiving player input at said user device processor selecting at least one of said possible bonus awards which was earned through said game application but not issued at said user device.

16. The system of claim 12 wherein said bonus award is associated with a player identifier and said program instructions executable by said gaming device processor further comprise:

receiving a player identifier through said gaming device interface such that said bonus award received from said award server is a bonus award associated with said player identifier received at said gaming device;

storing at least one display refresh event in said gaming device memory, wherein said display refresh event includes removal of said player identifier received at said gaming device such that said bonus award is available to be issued only in gambling games conducted while in receipt of said player identifier associated with said bonus award; and holding said bonus award at said display until the occurrence of said at least one bonus award trigger or said at least one display refresh event, whichever occurs first.

17. The system of claim 12 wherein said bonus award trigger is determined, at least in part, by said outcome of said gambling game generated by said gaming device processor.

18. The system of claim 12 wherein said bonus award trigger is independent of said outcome of said gambling game generated by said gaming device processor.

19. A system comprising:

a user device comprising:

a user device processor;

a user device display; and a user device memory in communication with said user device processor, said user device memory configured to store program instructions executable by said user device processor to display an outcome of a game application at said user device display, wherein said outcome of said game application may include a bonus award which is earned through said game application without issuing said bonus award at said user device;

an award server in communication with said user device comprising:

an award server processor; and an award server memory in communication with said award server processor, said award server memory configured to store program instructions executable by said award server processor to receive said bonus award from said user device and store said bonus award in association with a player identifier; and a redemption device in communication with said award server comprising:

a redemption device processor; and a redemption device memory in communication with said redemption device processor configured to store program instructions executable by said redemption device processor to conduct the steps of:

receiving said bonus award from said award server; receiving a prompt to issue said bonus award at said redemption device; and issuing said bonus award at said redemption device in response to said prompt.

20. The system of claim 19 further comprising:

a display; and at least one gaming device in communication with said award server and said display, said at least one gaming device separate from said award server and operating independently from said award server, comprising:

gaming device processor including a random number generator, said random number generator configured to generate a random number used, at least in part, to generate an outcome for a gambling game;

a gaming device interface in communication with said gaming device processor; and a gaming device memory in communication with said gaming device processor configured to store at least one bonus award trigger and program instructions executable by said gaming device processor to conduct the steps of:

receiving a player identifier through said gaming device interface;

retrieving at least one bonus award associated with said player identifier from said award server;

displaying a bonus indicium associated with said at least one bonus award on said display;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one bonus award trigger has occurred; and issuing said at least one bonus award at said at least one gaming device when said at least one bonus award trigger occurs.

* * * * *